Figure 1:
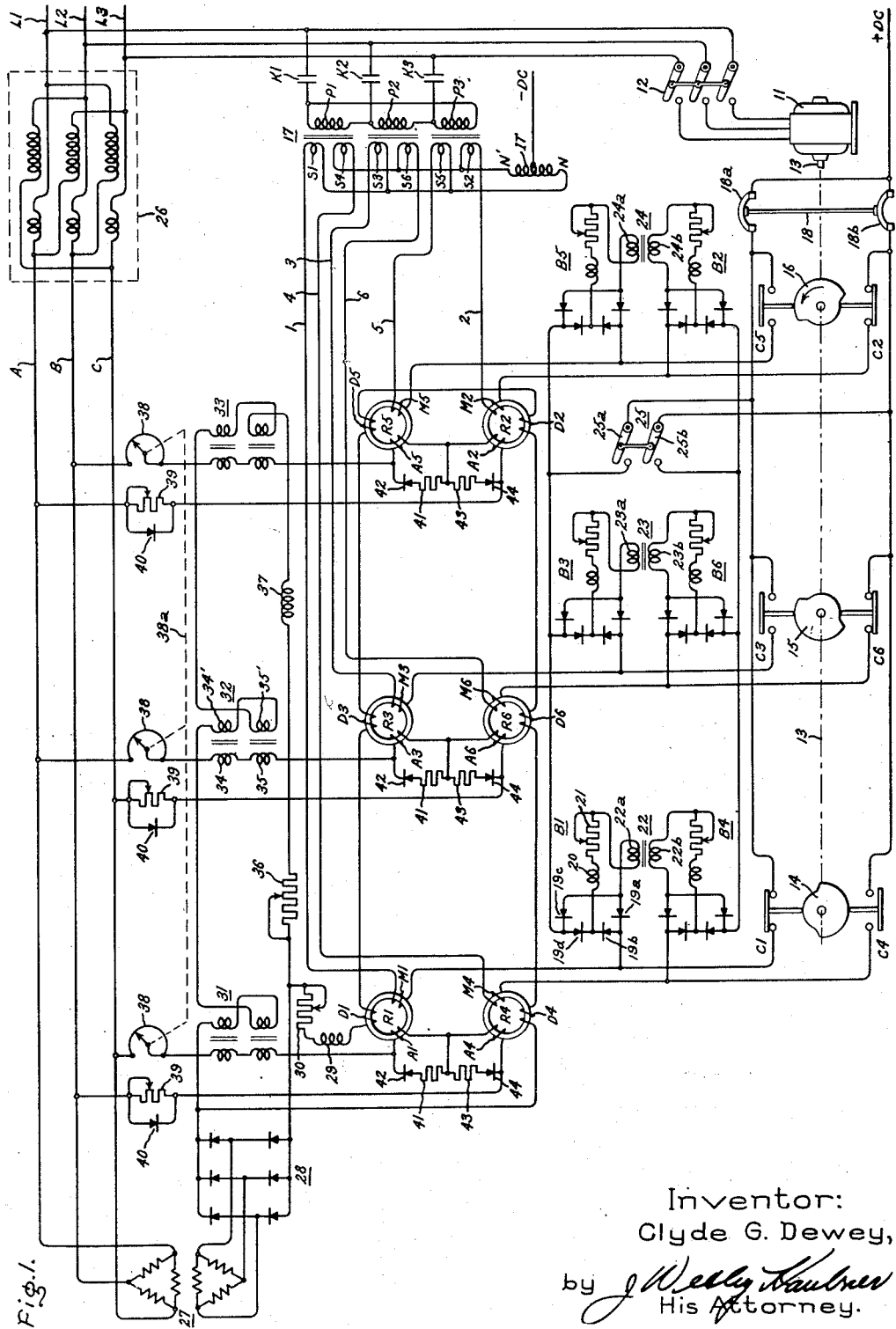

Inventor:
Clyde G. Dewey,
by J. Wesley Laubner
His Attorney.

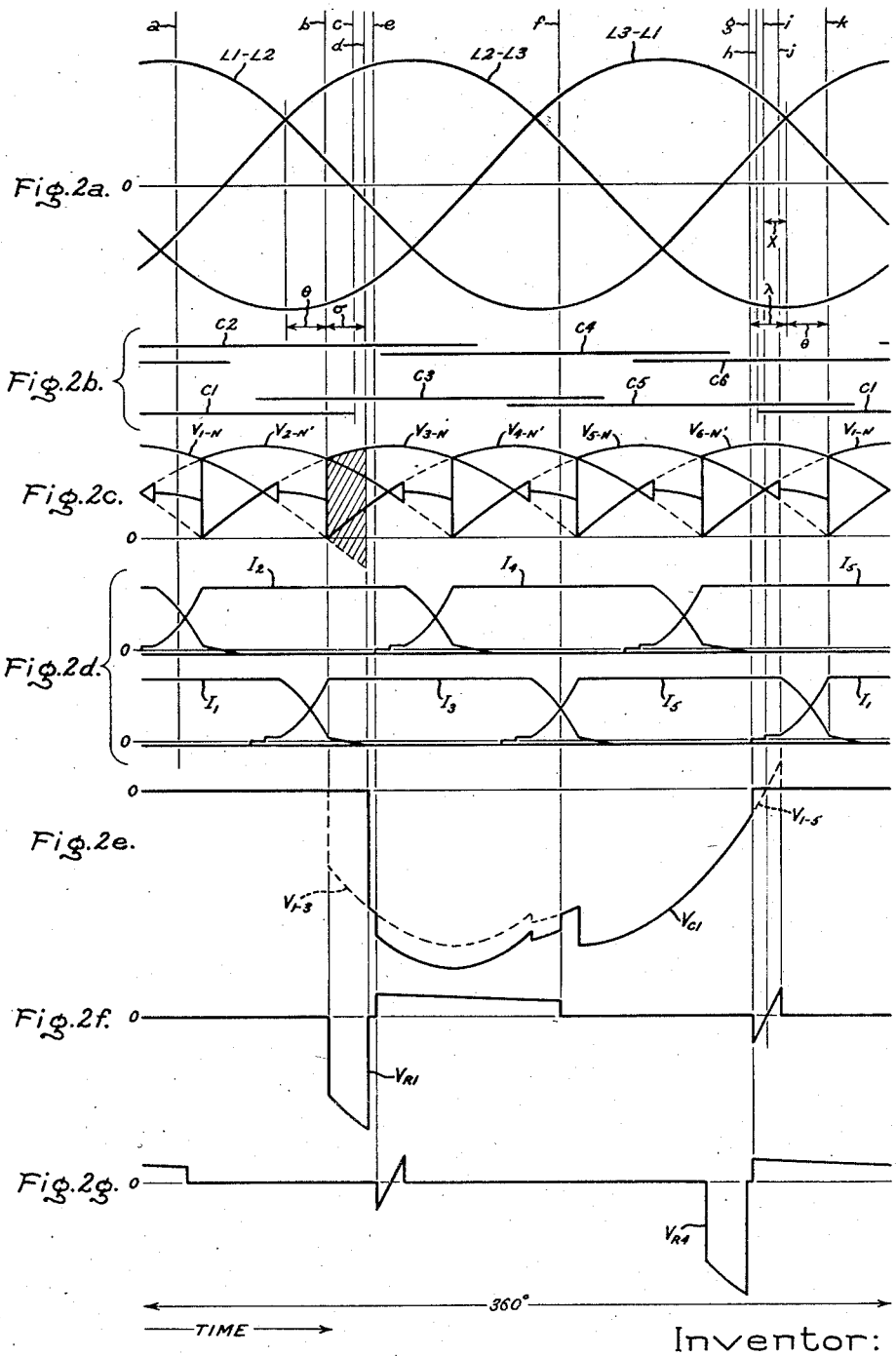

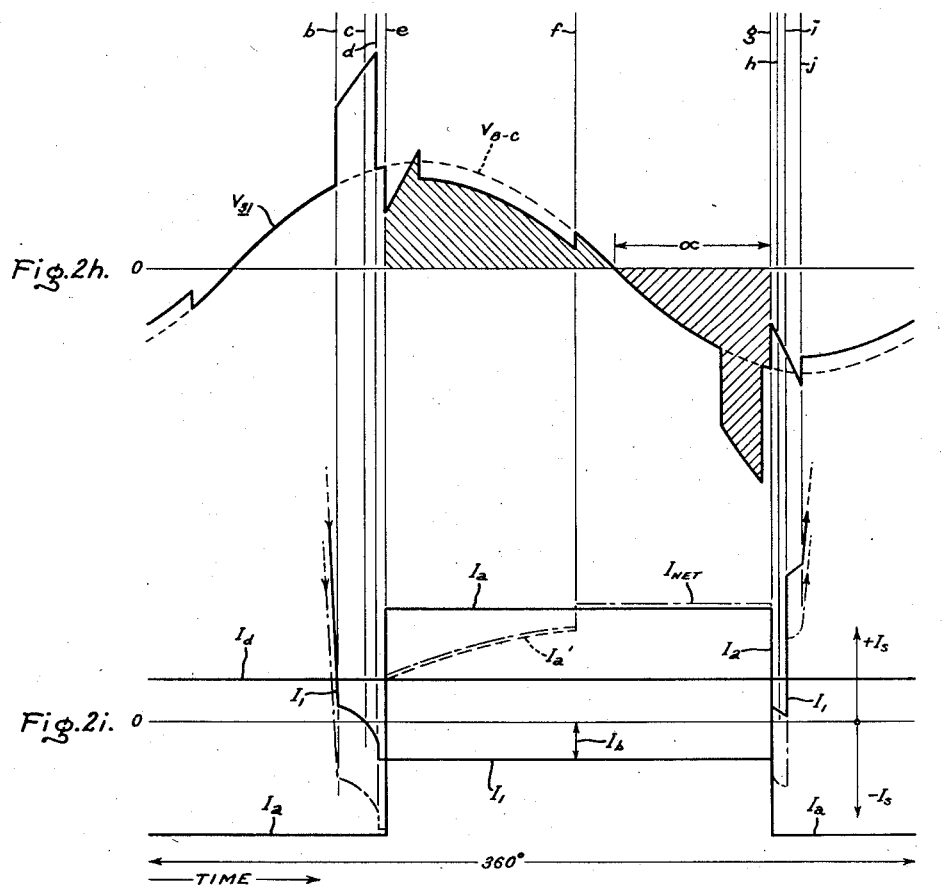
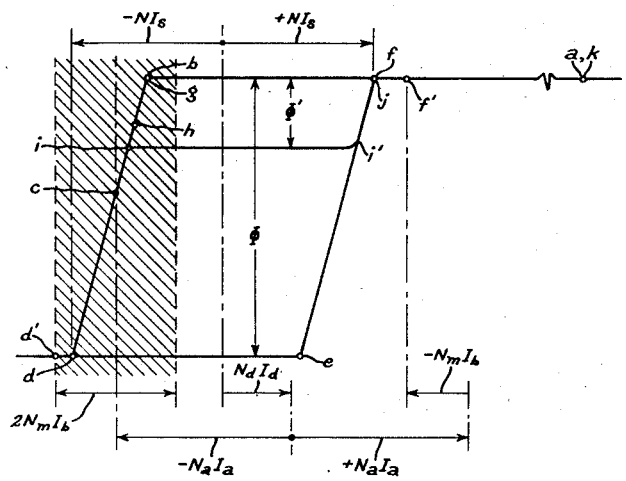
Inventor:
Clyde G. Dewey,
by J. Wesley Haubner
His Attorney.

May 13, 1958

C. G. DEWEY 2,834,932

CONTROL SYSTEM FOR PREVENTING CONTACT SPARKING
IN SYNCHRONOUS SWITCHING APPARATUS

Filed July 25, 1955

4 Sheets-Sheet 4

Inventor:
Clyde G. Dewey,
by J. Wesley Haubner
His Attorney.

United States Patent Office 2,834,932
Patented May 13, 1958

2,834,932

CONTROL SYSTEM FOR PREVENTING CONTACT SPARKING IN SYNCHRONOUS SWITCHING APPARATUS

Clyde G. Dewey, Philadelphia, Pa., assignor to General Electric Company, a corporation of New York Application July 25, 1955, Serial No. 524,178

11 Claims. (Cl. 321—48)

This invention relates to control systems for preventing contact sparking in synchronous switching apparatus, and more particularly to improvements in the contact operation of a mechanical rectifier.

Apparatus comprising a plurality of circuit opening and closing switch contacts which are synchronously actuated in overlapping sequence to supply a direct current load from successive phases of a polyphase source of alternating current is known as a mechanical rectifier. When supplied by 60 cycles per second alternating electric power, the contacts of a mechanical rectifier must complete over five million opening and closing cycles a day. Contact life and contact maintenance requirements therefore become extremely important factors in successful operation of equipment of this type, and contact wear must be reduced to practically zero. Toward this end, saturable commutating reactors have been used in a manner, such as described and claimed in U. S. Patent No. 2,284,794 issued to Burnice D. Bedford on June 2, 1942, to establish, after commutation between overlapping contacts, a period of substantially zero contact current and voltage during which the contact associated with the outgoing phase of alternating current can be safely opened without electric sparking. Thus, the contacts while opening are not subjected to the deleterious effect of electric sparking which would rapidly damage the contact material and render the rectifier inoperable. It has been found that conditions during contact closure are also important in preventing contact deterioration. The voltage across a contact the instant before it closes, the rate of rise of current just after the contact closes, and the time required to establish full contact pressure are all principal factors involved in achieving long contact life. Although certain circuit arrangements have been used to insure negligible current flow at the instant of contact making and to prevent a rapid rise of current immediately thereafter, I am unaware of any arrangement known heretofore which operates to prevent voltage of any appreciable magnitude from appearing across the contact for a definite period of time both before and after contact closure. A system to thus limit contact voltage would prevent "prestriking," i. e., dielectric breakdown in the air gap just before the instant of contact making, and such a system also would eliminate any tendency for current to "re-strike" if the contact bounces during closure.

It is therefore a general object of this invention to provide means for reducing to substantially zero the initial current and voltage in the circuit to be closed by a mechanical rectifier contact thereby virtually eliminating any tendency for the contact to spark while closing.

It is another object of this invention to provide, in synchronous switching apparatus for rectifying alternating current, means for limiting contact current and voltage to negligible values for an appreciable closing period during which the contact can be closed at any instant without sparking, the successful operation of said means being substantially independent of the magnitudes of rectified current and voltage.

It is still another object of this invention to provide, for a mechanical rectifier having commutating reactors for limiting current during contact separation, means utilizing the same reactors to reduce to substantially zero the current and voltage values in the circuits being closed, thereby to prevent sparking during contact closure.

A further object is to provide, in a mechanical rectifier provided with commutating reactors and connected to supply a direct current load from a source of alternating voltage, means to pre-excite the commutating reactors in a manner to insure sparkless contact closing and also to control the magnitude of direct voltage supplied to the load.

This invention has for another object the provision, in a mechanical rectifier, of improved contact shunting circuits for bypassing not more than a limited amount of current around an open contact and for limiting the voltage across the contact to a negligible magnitude whenever less than the limited amount of current is being bypassed.

In carrying out my invention in one form, I utilize a switching mechanism comprising a plurality of synchronously actuated contacts arranged to open and close associated phase circuits in overlapping sequence thereby to rectify alternating current supplied from a source of polyphase alternating voltage. In connection with this switching mechanism, I provide a plurality of bi-directional shunting circuits each connected to bypass one of the contacts for conducting not more than a pre-determined limited magnitude of current whenever the associated contact is open and for limiting the voltage across the open contact to a negligible magnitude whenever less than the pre-determined magnitude of current is being bypassed. The main winding of a saturable commutating reactor is connected in series in each phase circuit, and rectified current flowing through this winding magnetizes the reactor in its forward direction. I provide separate control means for each reactor comprising at least another winding which is supplied with an alternating bias current of substantially rectangular waveform. The positive half cycle of bias current has sufficient magnitude to saturate the reactor in its forward direction, even with reverse current of the predetermined limited magnitude flowing through the main winding and the associated contact shunting circuit, while the negative half cycle of bias current has proper magnitude to unsaturate the reactor. The bias current is derived from the alternating voltage source and is phased to change from positive to negative before the contact associated with the reactor main winding, which contact is connected to the incoming phase of alternating voltage, is closed and in advance of zero voltage in the incoming phase circuit. The associated reactor is unsaturated or pre-excited at this instant of bias current change, and current in the incoming phase circuit will be limited to less than the aforesaid predetermined magnitude by the resulting high reactance. This high reactance also causes voltage in the incoming phase circuit to shift from across the open contact to the main winding. The incoming phase contact may be safely closed without sparking at any time during this unsaturated period, since the contact current and voltage values are now negligible. The change of flux in the reactor at this time is controlled by the voltage in the phase circuit, which voltage is applied to the main winding. This voltage comprises the difference between the voltages of the outgoing phase of alternating voltage which is decreasing and the incoming phase of alternating voltage which is increasing. As soon as the incoming phase voltage exceeds the outgoing phase voltage, the difference voltage has proper polarity to cause the reactor to resaturate in its forward direction. Upon reaching saturation, the incoming phase circuit commutates with the outgoing phase circuit in the usual manner.

My invention is particularly suitable for a mechanical rectifier of the type comprising six contacts which periodically close circuit at sixty electrical degrees intervals and which remain closed for less than 180 electric degrees. Each contact has an associated commutating reactor, and the control windings for each pair of reactors associated with contacts which have inverse operating cycles are interconnected in opposing series circuit relationship. Each pair of interconnected windings is supplied with a common alternating bias current, and thus the same half cycle of bias current which saturates one of the paired reactors in its forward direction will unsaturate the other reactor. The pre-excitation action with this arrangement is identical to that described above, and each of the paired reactors will be pre-excited by alternate changes in direction of the bias current.

Each of the current limiting contact shunting circuits referred to above preferably comprises a rectifier bridge network having alternating current and direct current terminals. The alternating current terminals are connected across the associated contact, while an inductive circuit is connected across the direct current terminals. The inductive circuit limits the flow of current through the shunting circuit to a predetermined maximum value when voltage is applied to the alternating current terminals while the associated contact is open. I provide transformer coupling means for interconnecting the inductive circuits of each pair of shunting circuits associated with each pair of contacts which are cyclically operated in inverse relationship with respect to each other, whereby voltage is supplied to one shunting circuit when the contact associated with the other shunting circuit is open. In this manner, the predetermined value of current in each inductive circuit is maintained while its associated contact is closed.

Figure 5:
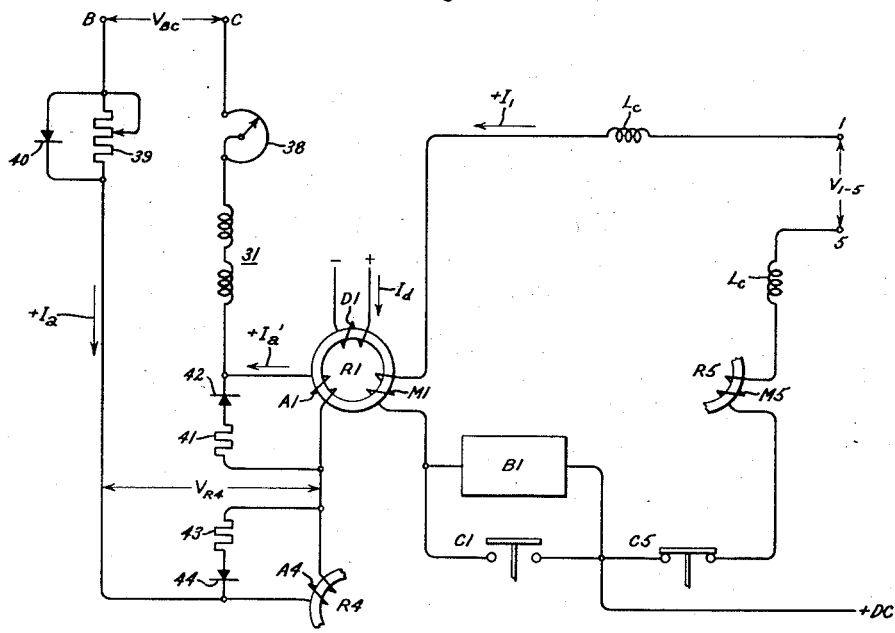
Figure 6:
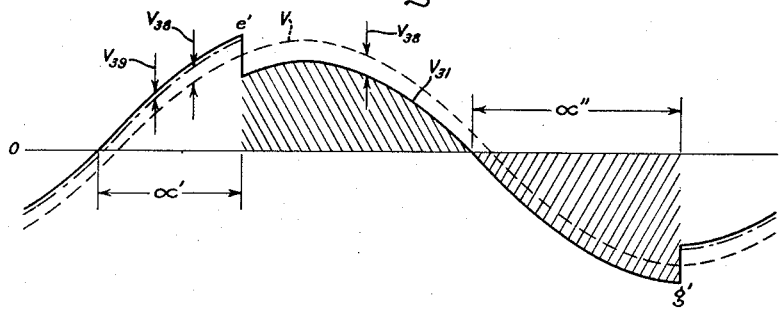
Figure 4:
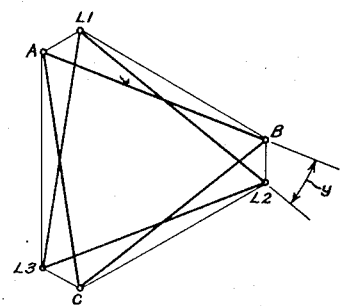

My invention will be better understood and further objects and advantages will be apparent from the following description taken in conjunction with the accompanying drawings, in which Fig. 1 is a schematic circuit diagram of a mechanical rectifier embodying a preferred form of the control system of the present invention by which contact sparking is prevented; Figs. 2a–2i are charts showing certain current and voltage relationships during a cycle of operation of the rectifier of Fig. 1 to facilitate an understanding of my invention; Fig. 3 is a schematic representation of the magnetic characteristics or hysteresis loop of a commutating reactor; Fig. 4 is a vector diagram of the voltage relationships associated with the phase shifting transformer bank shown in Fig. 1; Fig. 5 is a simple diagrammatical illustration of a control circuit for a pair of interconnected commutating reactors taken from Fig. 1; and Fig. 6 is another voltage-time chart of voltage applied to a current limiting reactor combination to illustrate another feature of my invention.

I have shown schematically in Fig. 1 a single-way mechanical rectifier the components and operation of which will be discussed generally before proceeding to a specific description of my invention. The mechanical rectifier is supplied by three-phase alternating voltage and current via supply lines L1, L2 and L3 from a suitable source of electric power (not shown). A three-phase synchronous motor 11 is coupled to the supply lines by a three-pole disconnect switch 12, and a shaft 13 of motor 11 rotates at a speed in synchronism with the alternating voltage. Disposed at radial intervals of 120 degrees on shaft 13 are three similar cams 14, 15 and 16 which cyclically operate switch contacts C1–C6.

This contact actuating mechanism may be constructed, for example, in accordance with the approved form described and claimed in U. S. Patent No. 2,713,095, issued to H. P. Fullerton on July 12, 1955. With the cam arrangement illustrated schematically in Fig. 1, the speed of motor 11 when supplied by conventional 60 cycles per second alternating voltage will be 3600 R. P. M., or one revolution of shaft 13 per cycle of alternating voltage.

In the illustrated embodiment of my invention, a conventional delta-double-Y-connected power transformer 17 is provided to derive six-phase alternating voltage of suitable amplitude from the three-phase supply power. The delta-connected primary windings P1, P2 and P3 of transformer 17 are coupled to supply lines L1, L2 and L3 through capacitors K1, K2 and K3 respectively. The function of these capacitors will be explained in detail hereinafter. The secondary windings of transformer 17 are disposed in two Y-connected sets. Secondary windings S1, S3 and S5 supply phase circuits 1, 3 and 5 respectively and have a common neutral point N. Secondary windings S2, S4 and S6 supply phase circuits 2, 4 and 6 respectively and have a common neutral point N'. Phase circuits 1–6 are connected through main windings M1–M6 of suitable saturable commutating reactors R1–R6, respectively, to the circuit opening and closing switch contacts C1–C6 respectively. Contacts C1, C3 and C5 are connected through pole 18a of a two-pole circuit breaker 18 to a positive D. C. lead, and contacts C2, C4 and C6 are connected through pole 18b of circuit breaker 18 to the same positive D. C. lead, as shown in Fig. 1. Circuit breaker 18 is normally closed and is used in connection with mechanical rectifier starting, as will be explained hereinafter. An interphase transformer IT interconnects neutral points N and N', and this transformer is tapped at its center by a negative D. C. lead as indicated in Fig. 1. The positive and negative D. C. leads are connected to a load circuit, not shown, which is supplied with direct current and voltage by virtue of the rectifying action of the contacts C1 to C6.

With reference to Figs. 2a–2d, the basic operation of the illustrated mechanical rectifier can now be explained. Fig. 2a is a voltage-time chart of the three-phase alternating voltages of supply lines L1, L2 and L3 during one electrical cycle or 360 electrical degrees. Assuming that approximately full load rectified current is being supplied to the load circuit, Fig. 2c illustrates for the same electrical cycle the positive half cycles of the six-phase alternating voltages appearing across the secondary windings of transformer 17 with respect to neutral. The traces of Fig. 2b indicate the periods in this cycle during which each switch contact is closed. The contact closed periods are determined by the contact actuating mechanism and are made to have the predetermined relationships with respect to supply line voltage which are shown, for example, by Figs. 2a and 2b. Thus, the contacts associated with successive transformer secondary phases are sequentially closed at 60 degree intervals, and each phase circuit is connected to the positive D. C. lead for a period greater than 120 electrical degrees but less than 180 electrical degrees during the positive half cycle of its voltage. In each set of Y-connected secondary windings, the winding which is positive with respect to the two associated windings is connected to the positive D. C. lead and tends to supply current to the load circuit. The resulting current waveforms are shown in Fig. 2d. The total rectified current supplied to the load in the illustrated embodiment of my invention has twice the magnitude of current furnished by each secondary winding alone, and this load current is held substantially constant by the inductance in the circuit.

At each instant of time at least two of the six phases of secondary voltages are connected in parallel to the common positive D. C. lead. Therefore a voltage difference is developed between neutral points N and N', and a voltage drop appears across interphase transformer IT. By connecting the negative D. C. lead to a center tap of transformer IT, one half of this voltage drop is subtracted from the voltage across the more positive phase of transformer secondary voltage and one half is added to the voltage across the less positive phase of transformer secondary voltage, and the instantaneous positive-to-negative direct voltage supplied to the load circuit is equal to the average of the two phase voltages.

The contacts C1, C3 and C5 associated with the Y-connected set of transformer secondary windings S1, S3 and S5 are cyclically closed and opened in overlapping sequence, and during each overlap period the two windings which are interconnected through their respective closed contacts are effectively short circuited. Similar relationships exist with respect to the Y-connected set of transformer secondary windings S2, S4 and S6. It is during the contact overlap periods that commutation, which is the transfer of load current between the corresponding incoming and outgoing phases of alternating voltage, occurs. In other words, while each phase of the trio of alternating voltages is interconnected to the next succeeding phase, current will transfer from the outgoing phase whose positive half cycle of voltage is waning to the succeeding incoming phase whose positive half cycle of voltage is just beginning. For example, commutation from phase five to phase one takes place between $j$ and $k$ as shown in Figs. 2c and 2d. The fact that the voltage 1–N of the incoming phase circuit has become more positive than the voltage 5–N of the outgoing phase circuit causes this transfer of current from winding S5 to the interconnected winding S1. The commutating reactance of the short circuit, which is determined by the inductance opposing change of current, prevents an instantaneous transfer of current from outgoing to incoming phase circuits.

In order that the outgoing phase switch contact can be opened without sparking immediately following commutation, the commutating reactors R1–R6 are provided. These reactors preferably are constructed with closed cores made of thinly laminated high-permeability magnetic material such as 50–50 nickel-iron alloy. The rectangular hysteresis loop for a typical commutating reactor is shown in Fig. 3, and the abrupt saturating characteristic is evident. Although the actual hysteresis characteristic of a commutating reactor may not be exactly as shown by Fig. 3, this representation is sufficiently accurate to clearly illustrate the principles of my invention. For a given number of turns around its core, the reactor will be just saturated by a magnitude of current which is exceptionally low with respect to the maximum current carrying ability of the reactor. For example, less than 6 amperes may saturate a reactor designed to carry 6,000 amperes full load. The permeability of such a reactor when saturated is negligible and when unsaturated is extremely high, approaching infinity. Accordingly, the reactance of each commutating reactor R1–R6 sharply changes from a negligible value to an extremely high value as the reactor comes out of saturation, and in its unsaturated state the reactor is effective to limit to a very low quantity the rate of change of current in its windings.

Each reactor is provided with suitable control means, such as the pair of control windings A1–A6 and D1–D6, respectively, illustrated in Fig. 1, and the control means is arranged, as will be explained fully hereinafter, to provide the proper amount of ampere turns to just unsaturate the reactor when the rectified current, which flows in a forward direction through the associated main winding M1–M6, has been reduced to practically zero. At the end of commutation, the current in the outgoing phase has decreased from its full load value to practically zero, and at this moment the associated commutating reactor unsaturates and introduces a large reactance into the circuit. As the flux in the reactor core decays from its saturation value, a voltage is induced in the main winding. The polarity of this voltage is such as to oppose the decay of flux which produced it, and by Kirchhoff's law, the induced voltage can not exceed the voltage available in the circuit of the main winding. This voltage is the transformer secondary phase-to-phase voltage, i. e., the difference between the voltages of the interconnected incoming and outgoing phase circuits; and its magnitude determines and controls the rate of change of flux in the reactor. The reactor will remain unsaturated until flux has decayed to zero and built up in the opposite direction to a reverse saturation value. The period of unsaturation is known as the "dragout step" of the commutating reactor.

The time required to change from forward to reverse saturation during the dragout step of a commutating reactor is dependent upon the voltage available to cause this change. Consider the dragout step of reactor R1. After commutation from phase one to phase three, the current in the outgoing phase circuit 1 of the transformer secondary winding S1 has decreased to practically zero and reactor R1 unsaturates. This moment is indicated by $b$ in Figs. 2c and 2d. The reactor will now tend to saturate in the reverse direction, and its flux must change an amount $\Phi$, or from $b$ to $d$ as shown on the hysteresis loop in Fig. 3. The equation for induced voltage $e$ in winding M1 during this change in flux is $$edt = -10^{-8} N_m d\phi$$

where $\phi$ represents instantaneous flux and $N_m$ is the number of turns of main winding M1. When integrated, the left hand quantity is known as "volt seconds." The total volt seconds required for the dragout step, therefore, is equal to the integral of the right hand quantity or $10^{-8} N_m \Phi$. The voltage at M1 during this time is the difference between voltage 1–N and voltage 3–N, since contacts C1 and C3 are closed and there is no voltage drop across main winding M3 due to reactor R3 being saturated. It should be noted that voltage 1–N is negative with respect to voltage 3–N so that the polarity of the voltage difference is such as to tend to drive current in the reverse direction through main winding M1, and accordingly the tendency is for reactor R1 to saturate in its reverse direction.

The total volt seconds required for dragout is represented, by way of example, by the cross hatched area shown in Fig. 2c between voltages 1–N and 3–N and between instant $b$ and instant $d$. Thus, the time required for dragout, which time is designated as $\sigma$ angular degrees in Fig. 2, is readily determined from knowledge of the total volt seconds requirement. Contact C1 can be safely opened at any time during the dragout step without sparking, since the current in the outgoing phase circuit 1 is now limited to a negligible value by the high reactants of commutating reactor $R_1$, and the circuit voltage is being utilized by the reactor as explained above. Contact C1 is opened ideally at moment $c$, as shown in Figs. 2b and 3, for at this moment the actual current in main winding M1 and contact C1 is zero.

It is usual practice to provide a current limiting shunting circuit to bypass each switch contact C1–C6. The shunting circuits are indicated generally in Fig. 1 by reference characters B1–B6 and will be described in detail hereinafter. Each circuit is designed to divert readily any small magnitude of current that may in fact be flowing in the associated contact at the instant the contact opens. However, a shunting circuit will bypass only a predetermined limited magnitude of current regardless of the magnitude of voltage applied across it. The shunting circuits are required to provide a low inductance path for current interrupted by an outgoing phase contact while opening, since even a very small magnitude of current would otherwise cause contact sparking due to the highly inductive outgoing phase circuit at this time. A shunting circuit also enables the dragout step of a reactor to be completed after the associated contact opens. This circuit will conduct the necessary reverse current which must flow in the main winding to completely saturate the reactor in its reverse direction.

The function of capacitors K1, K2, and K3 will now be considered. Frequently a mechanical rectifier is used to supply a load circuit having variable load current requirements. The commutating time between successive incoming and outgoing phases will vary with changing load current magnitude, as is apparent from consideration of the fundamental equation $$e = L\frac{di}{dt}$$

which applies during commutation. Rearranging and substituting, this equation becomes $\int e\,dt = 2L_c I$, where $\int e\,dt$ is the total volt seconds required for commutation ($e$ being the nominal voltage difference between the interconnected incoming and outgoing phases, which voltage difference causes commutation to occur), $L_c$ is the commutating inductance of each phase circuit, and $I$ is the rectified current supplied by each phase. On the other hand, the contact actuating mechanism preferably operates independently of load current magnitude, and thus the overlap periods between successive incoming and outgoing phase contacts are relatively fixed in relation to the alternating voltage cycle. To obtain the essential sparkless contact opening, commutation always must end at least within a predetermined span of time prior to the opening of the outgoing phase contact, regardless of load current magnitude, whereby the dragout step of the outgoing phase commutating reactor is always effective to eliminate sparking as described above. If the end of commutation were made to occur consistently at a fixed point in the alternating voltage cycle, the size of the commutating reactor, that is the magnitude of its $\Phi$, could be relatively small depending primarily on the desired margins of safety. Toward this end, August Schmidt, Jr., in his Patent 2,797,381, issued on June 25, 1957, has described and claimed a system using series connected capacitors for producing commutating voltage.

In accordance with the aforesaid Schmidt invention, capacitors K1, K2 and K3 are connected in series circuit relationship with the transformer primary windings P1, P2 and P3 as shown in Fig. 1. Each capacitor is charged to a voltage proportional to the load current magnitude, and the nominal or no-load transformer secondary phase-to-phase voltage is increased by the voltages of two capacitors during commutation. The contact driving mechanism is arranged to preclose each switch contact C1–C6, i. e., the incoming phase contact is closed before voltage zero, or in other words, while the outgoing phase voltage is still positive with respect to the incoming phase voltage. The preclosing angle, which is measured with respect to the instant of nominal incoming to outgoing phase-to-phase voltage zero, is represented by the symbol $\lambda$, and an effective preclosing angle for contact C1 is indicated, by way of example, in Figs. 2a and 2c. The control means for each commutating reactor is arranged so that a reactor is saturated in its forward direction before preclosing of the associated contact. The initial effect realized upon preclosing an incoming phase contact in accordance with the Schmidt invention is to unsaturate the associated reactor, since the positive outgoing phase voltage will tend to drive current in the reverse direction through the incoming phase reactor main winding. But after the actual voltage zero is reached, the incoming phase voltage becomes positive with respect to the outgoing phase voltage, and the incoming phase reactor will resaturate in its forward direction. Upon regaining saturation, the reactance of the incoming phase reactor, which until this moment has limited current change in the interconnected incoming and outgoing phase circuits, sharply decreases to a negligible value, and commutation begins. Commutation ends at an angle $\theta$ after the instant of nominal phase-to-phase voltage zero.

The capacitive reactance of capacitors K1, K2 and K3 and the angles $\lambda$ and $\theta$ are selected so that the total cumulative volt seconds of two capacitors during the interval $\lambda + \theta$, that is, from the moment of preclosing to the end of commutation, will always equal the total volt seconds required for commutation. In effect, the series connected capacitors K1, K2 and K3 supply the volt seconds requirements of commutation; the capacitor voltages automatically adjusting to compensate for variations in load current. As a result, the interval $\lambda + \theta$ will remain constant regardless of load current magnitude, and the criteria set forth above for obtaining sparkless contact opening with a relatively small commutating reactor is met. Angle $\theta$, which has been shown in Figs. 2a and 2c by way of example, is equal to the effective preclosing angle $\lambda$, and the nominal phase-to-phase alternating voltage has no net effect on commutation. At approximately full load current, capacitors K1, K2 and K3 effectively advance the phase position of the transformer secondary voltage relative to the nominal, no-load voltage by an angle such as represented in Figs. 2a and 2c by the symbol $x$.

In accordance with the present invention, control means are provided for the commutating reactors of the mechanical rectifier described above, whereby the commutating reactors R1–R6 are pre-excited in a manner to prevent sparking during contact closure. Thus the same commutating reactors which were provided to obtain successful contact opening are utilized as closing reactors. Before describing the pre-excitation circuits of my invention, however, it will be expedient to explain in detail the improved bi-directional contact shunting circuits B1–B6 illustrated in Fig. 1.

As shown in Fig. 1 each shunting circuit comprises four one way electric valves or rectifiers 19a, 19b, 19c and 19d connected in back-to-back pairs to form a conventional rectifier bridge network having a pair of A.-C. and a pair of D.-C. terminals. An inductance element 20 and an adjustably tapped resistor or rheostat 21 are connected in series circuit relationship to form an inductive circuit which is coupled to the D.-C. terminals of each rectifier bridge network. Three suitable coupling transformers 22, 23 and 24 are provided, each transformer including a pair of windings, 22a and 22b, 23a and 23b, and 24a and 24b, respectively, which have equal turns and share common iron cores. As can be seen in Fig. 1, the windings 22a and 22b of coupling transformer 22 are connected in series with the inductive circuits of shunting circuits B1 and B4 respectively, the windings 23a and 23b of coupling transformer 23 are connected in series with the inductive circuits of shunting circuits B3 and B6 respectively, and the windings 24a and 24b of coupling transformer 24 are connected in series with the inductive circuits of shunting circuits B5 and B2 respectively. One A.-C. terminal of each shunting circuit B1–B6 is connected to the supply voltage side of the contacts C1–C6 respectively. The other A.-C. terminals of shunting circuits B1, B3 and B5 are connected through pole 25a of a two-pole disconnect switch 25 to the common load circuit side of contacts C1, C3 and C5, and the other A.-C. terminals of shunting circuits B2, B4 and B6 are connected through pole 25b of disconnect switch 25 to the common load circuit side of contacts C2, C4 and C6. Disconnect switch 25 is normally closed and is used in connection with mechanical rectifier starting, as will be explained hereinafter.

Successful operation of a shunting circuit requires that current of a substantially constant magnitude be circulated continuously through the inductive circuit comprising element 20 and rheostat 21 together with a winding of the associated coupling transformer. Circulating current is designated $I_b$, and the source of this current will be explained later. With no voltage across the A.-C. terminals, the circulating current $I_b$ divides equally between two parallel paths, one path comprising rectifiers 19a and 19b and the other path comprising rectifiers 19c and 19d. In this state, the shunting circuit will freely bypass from either A.-C. terminal to the other any current having less magnitude than $I_b$. Bypassed current necessarily flows through the inductive circuit, and as long as less current than $I_b$ is being bypassed, although the rectifiers 19a–19d may not conduct equal currents, each rectifier must be conducting some current in its forward direction in order to sustain $I_b$ in the inductive circuit. Consequently, assuming that each rectifier 19a–19d has negligible forward resistance, there will be practically no voltage drop across the A.-C. terminals. It will be observed that even small forward voltage drops at the bridge-connected rectifiers tend to cancel each other.

With voltage of a predetermined recurrent wave pattern applied to the inductive circuit of a shunting circuit, the maximum current that can be bypassed is positively limited to the magnitude of circulating current $I_b$ by the inductance element 20 which impedes current change. With the maximum magnitude of current being bypassed, two rectifiers, either 19b and 19c or 19a and 19d, depending on the direction of the bypassed current, conduct the total current, and the remaining two rectifiers can conduct no current (assuming that each rectifier 19a–19d has the ideal infinite reverse resistance). This condition will be maintained regardless of the magnitude of voltage applied to the A.-C. terminals. The voltage applied to the A.-C. terminals appears across the non-conducting rectifiers and across the inductive circuit. In effect, each shunting circuit is a device which presents negligible impedance to small values of bypassed current and which has very high impedance to large values of current.

The manner in which circulating current $I_b$ is obtained will now be explained. Each switch contact C1–C6 is open during the greater portion of each cycle of mechanical rectifier operation, and there is a voltage drop across each open contact. For example, the voltage across contact C1, which voltage also appears across the A.-C. terminals of the associated shunting circuit B1, has been indicated in Fig. 2e, by the solid line curve $V_{C1}$. The voltage across contact C4 when open has the identical waveform but is displaced 180 electrical degrees from the voltage across contact C1 shown in Fig. 2e, since contacts C1 and C4 have inverse operating cycles, i. e., the two contacts are closed and similarly opened at 180 angular degrees intervals with respect to the rotation of synchronous motor shaft 13. As noted above, and as shown in Fig. 1, the shunting circuits B1 and B4 associated with contacts C1 and C4 are interconnected by the 1:1 ratio coupling transformer 22. While contact C1 is open, voltage $V_{C1}$ is applied to the A.-C. terminals of shunting circuit B1 and appears across the inductive circuit, dividing approximately equally between transformer winding 22a and the combination of inductance element 20 in series with rheostat 21. While contact C1 is closed, voltage is supplied to the inductance element 20 and rheostat 21 of shunting circuit B1 by transformer winding 22a which at this time will reflect approximately one half the voltage appearing across the open contact C4, since the voltage across C4 is divided approximately equally in shunting circuit B4 between transformer winding 22b and the combination of inductance element 20 in series with rheostat 21. It is the voltage across inductance element 20 and rheostat 21 that causes current $I_b$ to circulate through the rectifier bridge network. The inductance of element 20 and the resistance of rheostat 21 are selected so that with voltage available as described above, a predetermined, substantially constant magnitude of current $I_b$ will be maintained continuously in the inductive circuit. By providing coupling transformers 22, 23 and 24, and thus utilizing the voltages alternately appearing across inversely operated contacts to mutually maintain currents $I_b$, I am able to employ smaller, more efficient and more economical inductance elements 20, since these elements are not now required to maintain current $I_b$ unaided for the periods during which the associated contact is closed. In effect, the voltage applied to an inductance element 20 during each cycle of operation has been made nearly constant, and to maintain the magnitude of circulating current within desired limits, element 20 can have a value of inductance very much less than that which would be required if the coupling transformers were omitted.

The shunting circuits B1–B6 operate to bypass current around open switch contacts C1–C6. As described above, each circuit limits the maximum amount of bypassed current to the predetermined magnitude of current $I_b$, and whenever less than this maximum current is being bypassed, the voltage across the shunting circuit must necessarily be practically zero. In practice, the magnitude of circulating current $I_b$ preferably is selected to be about twice the largest magnitude of current expected to be diverted through the shunting circuit at the instant of contact opening. It is then possible, if the circuits of only one pair of back-to-back rectifiers, either 19a and 19c or 19b and 19d, are designed to have very low inductance, to obtain an extremely rapid and unimpeded transfer to the shunting circuit of any small amount of current that may be flowing through the contact when opened, which current is limited to a negligible value by the dragout step of the associated commutating reactor as explained hereinbefore. In other words, very low inductance in the circuits of one pair of back-to-back rectifiers enables the currents in these circuits to change substantially instantaneously, and as long as the initial current to be bypassed is less than one half the magnitude of $I_b$, the low inductance circuits will readily accommodate the diversion of this amount of current.

Although I have illustrated and described a particular embodiment of shunting circuit employing the improved circuitry of one aspect of my invention, it will be understood by those skilled in the art that there are other suitable shunting circuits that could be used in conjunction with the pre-excitation means described below. For example, the shunting circuit described and claimed in a copending patent application Serial No. 424,088 filed by Burnice D. Bedford and Robert W. Kuenning on April 19, 1954, and assigned to the present assignee might be adapted for use therewith.

The various circuits comprising the means for pre-exciting the commutating reactors thereby to insure sparkless contact closure in accordance with my invention will now be described. Suitable control power must be supplied to these circuits. In the illustrated embodiment of the invention, the control power is provided by conductors A, B and C which are coupled to supply lines L1, L2 and L3 by a conventional phase shifting transformer bank 26 shown schematically in Fig. 1. The phase shifting bank 26 may be of any suitable construction to obtain a phase displacement, if desired, between the control power alternating voltages and the supply power alternating voltages. Fig. 4 is a simplified voltage vector diagram of the illustrated phase shifting bank, and the angle of phase shift y can be adjusted by any suitable means (not shown) for varying the number of turns of the short windings.

A source of direct current is derived from the control power conductors A, B and C by means of a suitable three-phase transformer 27 and a group of six half wave rectifiers connected to form a full wave bridge type rectifier 28, as can be seen in Fig. 1. A connection is made from the positive terminal of rectifier 28, through commutating reactor control windings D4, D6, D2, D5, D3 and D1 respectively, to a choke coil 29 and rheostat 30, and thence to the negative terminal of rectifier 28. Rheostat 30 is adjusted to give a desired magnitude of direct current $I_d$ flowing in this circuit, and choke coil 29 is used to smooth the current flow and thus maintain $I_d$ substantially constant. The control windings D1–D6 each have $N_d$ turns, and the ampere turns $N_d I_d$ produced by current $I_d$, as indicated on the typical hysteresis loop shown in Fig. 3, tend to magnetize or bias each reactor R1–R6 in its forward direction. (The direction of magnetization resulting when rectified current flows through the main winding M1–M6 is called the forward direction.)

In the illustrated embodiment of my invention, control windings A1–A6 are arranged whereby the control windings for the two commutating reactors associated with each pair of switch contacts having inverse operating cycles are interconnected in opposing series circuit relationship. Thus, control windings A1 and A4, A3 and A6, and A5 and A2 are interconnected in this manner. Each pair of interconnected control windings is supplied with alternating bias current $I_a$ having rectangular waveform. The rectangular-wave bias current may be supplied by any suitable source, and as illustrated in Fig. 1 it is derived from the sinusoidal alternating voltage of control power conductors A, B and C by means of suitable current limiting reactor combinations 31, 32, and 33. Each combination 31, 32 and 33 comprises a pair of saturable reactor components having A.-C. windings 34 and 35 respectively which are series connected to carry bias current $I_a$, and having D.-C. windings 34' and 35' respectively which are connected in opposing series circuit relationship. These saturable reactors preferably have cores made of very thinly laminated material having reduced cross sectional area where disposed within the windings thereby to produce an abrupt saturation characteristic.

Direct current is supplied to the D.-C. windings 34' and 35' of each current limiting reactor combination by rectifier 28, and the magnitude of this current, as determined by the setting of a rheostat 36, is selected to produce a bias M. M. F. well above that required to just saturate each reactor. A choke coil 37 is used in the direct current circuit to smooth the flow of current. With this arrangement, the bias current $I_a$, during its positive half cycle, is limited to a predetermined maximum magnitude by one reactor component. The M. M. F. produced by this predetermined magnitude of current flowing through the corresponding A.-C. winding opposes the bias M. M. F. and unsaturates the reactor, whereupon the reactor becomes highly inductive to delay further increase of current in its windings. The other reactor component, whose bias M. M. F. is in the opposite direction, will react similarly to limit the magnitude of current $I_a$ during negative half cycles. The amplitude of $I_a$ is determined, therefore, by the magnitude of direct current supplied to the D.-C. windings 34' and 35'. Changing current $I_a$ between positive and negative limits of magnitude is unimpeded, since both reactor components are saturated and have negligible inductance in this range. By applying alternating voltage across the A.-C. windings 34 and 35 of each current limiting reactor combination 31, 32 and 33, a substantially rectangular current waveform is produced.

As can be seen in Fig. 1, the series connected A.-C. windings 34 and 35 of each current limiting reactor combination 31, 32 and 33 are connected to a different pair of control power conductors A, B and C through one pair of interconnected control windings, A1 and A4, A3 and A6, or A5 and A2, through a gang operated rheostat 38, and through a tapped resistor 39. Three separate control circuits are formed in this manner. A common operating means 38a is provided to simultaneously adjust the sliders of the rheostats 38 located in the three control circuits. A one-way electric valve or rectifier 40 is connected in parallel circuit relationship with each tapped resistor 39. Connected across each control winding A1, A3 and A5 is a unilateral resistive circuit comprising a resistor 41 in series with a rectifier 42, and connected across each control winding A2, A4 and A6 is a separate unilateral resistive circuit comprising a resistor 43 in series with a rectifier 44.

It will now be evident to those skilled in the art that while I have illustrated two separate control windings for exciting each commutating reactor, if desired an alternating bias current which is offset by the proper amount of direct current could be supplied through one common winding.

From the foregoing detailed description of preferred circuitry of my pre-excitation circuits, their mode of operation may now be readily followed. For the sake of convenient explanation, the description of operation given hereinafter will be directed to the pre-excitation circuits associated with only one pair of commutating reactors, namely, commutating reactors R1 and R4. This description will be equally applicable to the pre-excitation circuits for paired reactors R3, R6 and R5, R2, and from this description a clear understanding of the overall operation of a mechanical rectifier employing my novel pre-excitation means will readily follow. Reference will be made to Fig. 5, which is a somewhat simplified diagrammatical illustration of the pre-excitation circuits associated with commutating reactors R1 and R4, with particular attention given to reactor R1. Fig. 5 shows switch contact C1 about to begin its overlap period with switch contact C5.

As indicated by Fig. 5, the alternating bias current control circuit under consideration is connected to control power conductors B and C. The positive direction of rectangular bias current $I_a$ is arbitrarily chosen to be from conductor B through the control circuit to conductor C. Positive bias current flowing in control winding A4 magnetizes reactor R4 in its reverse direction, and positive bias current flowing in control winding A1 magnetizes reactor R1 in its forward direction. Rectifiers 42 and 44 are arranged as shown in Fig. 5 so that the total positive bias current $I_a$ must flow through control winding A4, but a portion of this current will be bypassed through resistor 41 and rectifier 42 around control winding A1. The balance of the positive bias current which flows in winding A1 is designated $I_{a'}$. It is clear that during the negative half cycle of bias current $I_a$ the conditions outlined above are reversed.

At this point, for the sake of orientation, one complete electrical cycle of operation will be briefly described with regard to the circuits associated with commutating reactor R1. Reference should be made to Figs. 2b–2f and 3. At moment $a$ in the illustrated cycle, contact C1 is closed (Fig. 2b), voltage $V_{1-N}$ is positive with respect to the voltages of the associated phases three and five (Fig. 2c), contact C1 is conducting rectified current (Fig. 2d), and commutating reactor R1 is saturated in its forward direction (Fig. 3). The particular disposition of the contact driving mechanism illustrated schematically in Fig. 1 corresponds to this instant of time $a$. Between moments $a$ and $b$, contact C3 precloses, voltage $V_{1-N}$ goes negative with respect to voltage $V_{3-N}$, and the rectified current is commutated from the outgoing phase circuit 1 to the incoming phase circuit 3. At instant $b$ the current in main winding M1, which current has decreased from full load value to practically zero during commutation, causes commutating reactor R1 to become unsaturated (Fig. 3), and the voltage difference $V_{1-3}$ between the outgoing and incoming phase circuits is applied across the now highly inductive commutating reactor main winding M1. The voltage appearing across the windings of commutating reactor R1 is illustrated in Fig. 2f.

During the ensuing dragout step of commutating reactor R1, current flowing through contact C1 is limited to a negligible magnitude, and this contact is safely opened at moment $c$ without sparking. The magnitude of ampere turns supplied by control windings A1 and D1 of reactor R1 preferably is selected so that the current flowing through main winding M1 must be zero at moment c. Any negligible magnitude of current which may in fact exist at this instant is readily diverted into shunting circuit B1. Sufficient reverse current can be conducted by shunting circuit B1 to enable commutating reactor R1 to complete its dragout step. At moment d in the illustrated cycle, reactor R1 saturates in its reverse direction (Fig. 3) and instantly loses its high reactance. As a result, the voltage difference $V_{1-3}$ now shifts from main winding M1 to the open contact C1 and its associated shunting circuit B1 (Fig. 2e), and the net ampere turns of reactor R1 increases to $d'$ (Fig. 3). From this moment to moment g there will be sufficient negative voltage across shunting circuit B1 to maintain the maximum magnitude of bypassed current $I_b$ flowing in the reverse direction through this circuit and main winding M1.

In the illustrated embodiment of my invention, the control circuit supplying rectangular bias current $I_a$ to control winding A1 of commutating reactor R1 is arranged to cause current $I_a$ to reverse from negative to positive direction at approximately moment e. Thus at moment e the net ampere turns of reactor R1 changes instantly from $d'$ to e (Fig. 3) whereupon the reactor again unsaturates. The resulting voltage induced in the windings of reactor R1 (Fig. 2f), which voltage is determined by the amount of bias current flowing through resistor 41 and rectifier 42 as will be discussed hereinafter, adds to the negative voltage drop across open contact C1 (Fig. 2e). By the time instant f is reached in the cycle under consideration, commutating reactor R1 becomes saturated again in its forward direction (Fig. 3) and the induced voltages in the windings of the reactor become zero (Figs. 2f and 2e) since substantially no further change in flux occurs. The above described change in saturation occurring between moments e and f is called the "reset step" of the commutating reactor. The magnitude of ampere turns supplied by control windings A1 and D1 of reactor R1 preferably is selected so that the net ampere turns of the reactor after reset are only slightly above saturation value, as shown by $f'$ in Fig. 3, with the full magnitude of positive bias current $I_a$ flowing through control winding A1 and with the maximum magnitude of bypass current $I_b$ flowing in the reverse direction through main winding M1.

The next change in circuit conditions is at moment g, which, as shown in Fig. 2, corresponds to λ electrical degrees before the nominal or no-load incoming to outgoing phase-to-phase voltage zero. Thus g is the effective instant of preclosing, but instead of closing contact C1 at this instant, the bias current $I_a$ is made to change from its positive to its negative direction. It is this change in bias current that pre-excites the commutating reactor R1 in accordance with my invention. The reversal of bias current direction at moment g pre-excites reactor R1 by causing it to unsaturate (Fig. 3). At this instant, voltage 5–N of the outgoing phase circuit 5 is still positive with respect to voltage 1–N of the incoming phase circuit 1 (Fig. 2c), and the voltage $V_{1-5}$ must shift from across contact C1 to main winding M1 (Figs. 2e and 2f) where it controls the rate of change of decaying flux in reactor R1. The current in the incoming phase circuit 1 is now limited to a negligible value by the highly reactive commutating reactor R1, and contact C1 can be closed safely at h without sparking. As shown by Figs. 2c and 2e, the phase-to-phase voltage $V_{1-5}$ becomes positive immediately after the point of zero voltage at instant i. The period of flux decay between g and i is called the "pump-in step" on the closing period of the commutating reactor, and the amount of flux deviation $\Phi'$ (Fig. 3) is determined by the amount of volt seconds under the $V_{1-5}$ voltage-time curve during this pump-in period.

At instant i in the illustrated cycle, the polarity of voltage $V_{1-5}$ changes, decay of flux in commutating reactor R1 must stop, and flux will begin to build up again in its forward direction. Current flowing in main winding M1 and the closed contact C1 will increase instantly to bring the net ampere turns of reactor R1 to point $i'$ shown in Fig. 3, and subsequently at moment j reactor R1 is resaturated (Fig. 3). The period of flux rebuilding between i and j is called the "pump-out step" of the commutating reactor, and since the total change of flux is again $\Phi'$, the same amount of volt seconds is required for pump-out as was available for pump-in. Upon resaturation, the reactance of commutating reactor R1 becomes negligible and the positive phase-to-phase voltage $V_{1-5}$ is now utilized to commutate load current from the outgoing phase five to the incoming phase one. Commutation is completed at moment k, at which time voltage $V_{1-N}$ is positive with respect to the voltage of its associated phases three and five (Fig. 2c), contact C1 is conducting the rectified current (Fig. 2b), and commutating reactor R1 is saturated in its forward direction (Fig. 3).

The cycle of operation described above for commutating reactor R1 and its associated circuits is experienced by each of the other five reactors R2–R6 connected in the other five phase circuits, the cycle of each successive phase being displaced 60 electrical degrees from the preceding phase. Thus, commutating reactors R1 and R4 have inverse operating cycles, i. e., their operating cycles are 180 degrees out-of-phase. During pre-excitation, commutating reactor R1 is sent through a minor hysteresis loop f—g—i—i'—j, with flux decaying and then resaturating as indicated in Fig. 3. The amount of flux deviation $\Phi'$ is dependent upon the magnitude of voltage $V_{1-5}$ at instant g, and this magnitude will vary in a reciprocal relationship to the magnitude of the voltage contribution by capacitors K1, K2 and K3, or in other words to the magnitude of load current. Thus, when load current increases (or decreases), moment j which marks the end of the pump-out step will advance (or retard), leaving more (or less) time before moment k for commutation of the increased (or decreased) load current. This is in accordance with the preclosing method of operation described hereinbefore, and as a result the moments g, h and k remain fixed with respect to the power supply alternating voltage. The time interval between g, the moment of preexcitation, and h, the moment of contact closure, is made short enough so that h always occurs during the pump-in step, even under maximum permissible load current conditions. On the other hand, a pre-excitation angle λ is chosen so that the commutating reactor will never saturate in its reverse direction during the pump-in step, even under no load conditions. It will be understood by those skilled in the art that although my invention is particularly adaptable for mechanical rectifiers employing the improved commutating voltage producing series capacitors mode of operation, it is nevertheless suitable for obtaining sparkless contact closure in mechanical rectifier systems other than that illustrated specifically by Fig. 1.

The rectangular bias current $I_a$ must change from positive to negative direction at moment g to pre-excite commutating reactor R1 as described above. The current limiting reactor combination 31, which is shown in simplified form in Fig. 5, operates to produce this current reversal, and the correct moment of reversal is obtained in the illustrated embodiment of my invention by applying to combination 31 the voltage waveform shown in Fig. 2h. Neglecting for the moment the effect of rheostat 38 and tapped resistor 39, the voltage $V_{31}$ of Fig. 2h comprises the control power voltage $V_{B-C}$, plus the voltage induced in the control winding A4 of commutating reactor R4 (which voltage, as shown in Fig. 2g, is 180 degrees out-of-phase with that of commutating reactor R1), less the voltage induced in control winding A1 of commutating reactor R1. The resulting rectangular waveform alternating bias current $I_a$ is shown in Fig. 2i. During each positive half cycle of bias current $I_a$, this current is limited to a substantially constant predetermined magnitude by the unsaturated saturable reactor component of combination 31, as previously explained. During the first portion of each positive half cycle of $I_a$, flux in the unsaturated component is changing in one direction under the influence of positive voltage $V_{31}$, and the amount of flux deviation in this direction is determined by the amount of volt seconds available. The amount of volt seconds available is indicated by the shaded area under the positive half cycle of voltage $V_{31}$ in Fig. 2h. When $V_{31}$ becomes negative, the direction of current $I_a$ cannot change from positive to negative until equal volt seconds have been supplied to change the flux in the presently unsaturated reactor component by an equal amount in the opposite direction thereby resaturating this component. Thus, the shaded section of the negative half cycle of voltage $V_{31}$, as shown in Fig. 2h, will have the same area as the shaded area under the positive half cycle of $V_{31}$. The unshaded areas of positive and negative half cycles of $V_{31}$ must also be equal to each other. As long as the circuits involved are symmetrical, each positive and negative half cycle of bias current $I_a$ has a period of 180 electrical degrees.

As can be seen in Fig. 2h, the symbol $\alpha$ is used to designate the angle by which the control power voltage zero leads the moment of bias current reversal $g$. The amplitude E of control power voltage is related to this angle by the equation:

$$E = \frac{Na\omega \, \S}{Nm \cos \alpha}$$

where $Na$ and $Nm$ are the number of turns of control winding A1 and main winding M1 respectively, and $\S$ is the volt seconds contribution of a commutating reactor during its dragout or reset step. For the purposes of the illustrated embodiment of my invention, I prefer to select a magnitude of control power voltage $V_{B-C}$, by means of suitable transforming means or the like (not shown), whereby the sum of angle $\alpha$ plus the pre-excitation angle $\lambda$ is approximately 90 degrees. Thus control power voltage $V_{B-C}$ is in phase with supply voltage L2—L3 whose zero value leads the nominal outgoing to incoming phase-to-phase voltage zero by 90 degrees, and the angle $y$ introduced by phase shifting transformer bank 26 can be approximately zero. Another consideration in selecting the magnitude of $V_{B-C}$ is to insure that the voltage $V_{31}$ available when bias current reverses is sufficient to provide the necessary driving force for instantly unsaturating the previously saturated component of current limiting reactor combination 31.

Angle $\alpha$ is substantially independent of load current magnitude, since changes in load current have little net effect on $V_{31}$. As a result, the moment of preexcitation $g$ has a substantially fixed relation to the power supply alternating voltage. Changing load current does affect the voltage contributed to $V_{31}$ by a commutating reactor during its pre-excitation period, but the volt seconds during the pump-out step exactly cancel the volt seconds during pump-in, and the net volt seconds contribution is zero. Changing load current also will affect the length $\sigma$ of the commutating reactor dragout step, since the voltage acting across the reactor during dragout varies according to the voltage contribution of capacitors K1, K2 and K3, while the total volt seconds required to completely saturate the reactor in its reverse direction is a constant determined by the characteristics of the particular reactor used. At low values of load current, the length of the dragout step may increase to such an extent that the commutating reactor cannot completely saturate in its reverse direction before bias current $I_a$ reverses direction. Under this condition, less volt seconds are required to reset the reactor, and as a result the angle $\alpha$ is increased by a slight amount. But the result is somewhat compensatory, because an increase in angle $\alpha$ decreases the pre-excitation angle $\lambda$ and thus advances the moment at which commutation ends and dragout begins, whereby more time is available in which the commutating reactor may completely saturate in its reverse direction before bias current $I_a$ changes direction.

As shown in Fig. 5 and previously stated, control winding A4 of commutating reactor R4 preferably is connected in opposing series circuit relationship with control winding A1 of commutating reactor R1. This interconnection between the reactors R1 and R4 is possible because the associated contacts C1 and C4 are inversely operated and the operating cycles of these two reactors are 180 degrees out-of-phase. The change in bias current direction from positive to negative at moment $g$, which change pre-excites commutating reactor R1, causes commutating reactor R4 to reset. Similarly, bias current $I_a$ changes direction from negative to positive at moment $e$ to pre-excite reactor R4, and at the same time this change causes reactor R1 to reset. Successful pre-excitation of a commutating reactor requires that the full amplitude of bias current $I_a$ be passed through its control winding, but the high reactance of the interconnected commutating reactor being reset at the same time tends to limit the flow of bias current. Accordingly, the unilateral resistive circuits 41, 42 and 43, 44 are provided and connected as illustrated in Fig. 5. The operation of these circuits will now be considered with reference to Figs. 2i and 3. The various quantities of ampere turns acting upon commutating reactor R1 as shown in Fig. 3 are represented with respect to time in Fig. 2i, and for the sake of convenience, it has been assumed that the number of turns $N_m$, $N_a$ and $N_d$ of each winding M1, A1 and D1 respectively are equal. It should be understood therefore that the currents shown in Fig. 2i are related to the actual currents flowing in the commutating reactor windings by the proper turns ratios.

At moment $b$ in the illustrated cycle of operation, rectified current has just been commutated from phase one to phase three, and the current $I_1$ in the outgoing phase circuit 1 has decreased to practically zero. At this moment the full magnitude of negative bias current $I_a$ is flowing in winding A1, and the net current exciting commutating reactor R1 is of the proper negative magnitude to unsaturate the reactor. Between $b$ and $d$ reactor R1 undergoes its dragout step, and contact C1 preferably opens at instant $c$ which corresponds to zero current $I_1$. At moment $d$ the net exciting current of commutating reactor R1 reaches $-I_s$, and the reactor saturates in its reverse direction. Current $I_1$, which now is being by-passed in the reverse direction around the open contact C1 by shunting circuit B1, is able to increase instantly to its limited maximum magnitude $I_b$, at which magnitude it will remain until moment $g$.

The next change in net exciting current occurs at instant $e$ when bias current $I_a$ reverses direction. Instant $e$ marks the begining of pre-excitation for commutating reactor R4 and also the beginning of the reset step for commutating reactor R1. As can be seen in Figs. 2i and 3, at instant $e$ reactor R1 unsaturates before the bias current in winding A1 has reached the full positive magnitude of $I_a$. During the entire reset step, the highly reactive reactor R1 limits the flow of current $I_{a'}$ in winding A1 to a magnitude less than that of $I_a$. However, the resistive circuit 41, 42 connected in parallel with winding A1 conducts the balance of bias current $I_a$, and thus the entire bias current is passed through control winding A4 of commutating reactor R4 at this time in accordance with the necessities of pre-excitation. The current $I_a - I_{a'}$ flowing through resistor 41 and rectifier 42 produces a voltage across control winding A1 which determines the rate of change of flux (and thus the rate of change of exciting current) in reactor R1 as this reactor resaturates in the forward direction. The magnitude of resistor 41 is selected to produce a voltage of proper magnitude whereby the reactor saturates in its forward direction within a desired interval of time. Thus, at moment $f$ commutating reactor R1 completes its reset step and loses its high reactance, and winding A1 can now easily conduct the entire magnitude of bias current $I_a$.

At moment $g$ bias current $I_a$ reverses from a positive to a negative direction, and the net current exciting commutating reactor R1 will instantly change to the proper negative value to just unsaturate the reactor. This is the beginning of pre-excitation for commutating reactor R1, and also the beginning of the reset step for commutating reactor R4. Due to resistive circuit 43, 44 being connected across control winding A4, the high inductance of winding A4 while reactor R4 resets does not prevent a rapid change in bias current direction from positive to negative at moment $g$. The negative voltage being applied to current limiting reactor combination 31 in the bias current control circuit (see Fig. 2h) forces a substantially instantaneous change by current $I_a$ to its full negative magnitude at instant $g$. Due to rectifier 42, this entire negative bias current must flow through control winding A1. Since the inductance $2L_c$ in the circuits connected to the main winding M1 of commutating reactor R1 is relatively small, and in fact is practically insignificant in regard to impeding current change of only a few amperes, current $I_1$, which has been flowing in a reverse direction through incoming phase circuit 1, will change immediately at moment $g$ from its maximum magnitude $I_b$ to a much smaller magnitude, whereby the value of net exciting current which just unsaturates reactor R1 is maintained. As illustrated in Figs. 2i and 3, current $I_1$ obtains a small positive magnitude at moment $g$.

The pump-in step or closing period of commutating reactor R1 takes place from moment $g$ to $i$. Voltage $V_{1-5}$ across main winding M1 controls the rate of decay of flux in the unsaturated reactor R1 during its pump-in step, and as is clear from Fig. 3, the net current exciting R1 must increase in a negative direction. Since bias current $I_a$ is substantially constant, the small magnitude of current $I_1$ now flowing through main winding M1 and shunting circuit B1 will gradually become more negative, as shown in Fig. 2i.

Contact C1 can be safely closed at any time between moments $g$ and $i$. During this appreciable closing period, the magnitude of current flowing in the phase circuit is very small, in accordance with the above description, and therefore only negligible current can flow in contact C1 upon closing. During the entire closing period the voltage $V_{1-5}$ in the phase circuit is being utilized across main winding M1 where it determines and controls the rate of decay of flux in commutating reactor R1. In addition, since less than the maximum magnitude of current $I_b$ is being bypassed by shunting circuit B1, this circuit presents negligible impedance to even the small magnitude of current being bypassed. As a result, substantially no voltage drop is present across contact C1 throughout the closing period, and contact C1 may be closed without prestriking or restriking, or in other words without sparking, whereby contact life expectancy is materially increased. Closing of contact C1 does not affect the pump-in step, and the limited current and voltage conditions just described continue until instant $i$ is reached in the cycle of operation.

Voltage $V_{1-5}$ goes through zero at instant $i$, whereupon the net ampere turns exciting commutating reactor R1 immediately change from $i$ to $i'$ (Fig. 3) and the reactor begins its pump-out step. Current $I_1$ flowing in main winding M1 and the closed contact C1 must now increase in its forward direction as can be seen in Fig. 2i. At moment $j$ the net exciting current has increased to $+I_s$ and reactor R1 resaturates. During the ensuing commutation period, rectified current $I_1$ rapidly increases and at moment $k$ reaches full magnitude. Commutating reactor R1 remains in a saturated condition until moment $b$ is reached in the succeeding cycle of operation. It will be understood that the rectified current $I_4$ flowing in phase circuit 4 follows the same course as that shown in Fig. 2i for current $I_1$ but is displaced 180 degrees therefrom, and that the reversal of bias current from negative to positive at moment $e$ pre-excites commutating reactor R4 in the same manner as described above for commutating reactor R1 at moment $g$.

The pre-excitation means of my invention may be used to control the level of average rectified voltage supplied to the load circuit. This voltage control is accomplished by what is known as "phase retard." By advancing the moment of pre-excitation of each commutating reactor from that shown in Figs. 2a–2i, the pre-excitation angle λ is lengthened, a longer time interval will be required for the pump-in and pump-out steps, and the moment at which commutation begins is retarded. Thus each outgoing phase of alternating voltage supplies voltage to the load circuit for a longer time immediately after zero voltage, and since this voltage during this time is less positive than the succeeding incoming phase of alternating voltage, the average voltage supplied to the load circuit is reduced. An increase in average rectified voltage could be produced by retarding the moment of pre-excitation. Several means are available for varying the exact moment for pre-exciting each commutating reactor, and these means will now be considered with specific reference to the pre-excitation circuits of commutating reactor R1.

The pre-excitation moment $g$ shown in Fig. 2 can be varied by shifting the phase relationship of $V_{B-C}$ with respect to the alternating supply voltage by means of phase shifting transformer bank 26. A phase shift by this means will displace $V_{31}$ from the relative phase relationship illustrated in Fig. 2h, and as a result the moment of bias current $I_a$ reversal will be advanced or retarded in relation to the power supply voltage cycle. Another means for obtaining voltage control is provided by the gang operated rheostat 38 connected in the alternating bias current control circuit as shown in Fig. 5. By adding resistance in this control circuit, angle α (Fig. 2h) is reduced, and the moment of bias current direction change is therefore advanced. Rheostat 38 and current limiting reactor combination 31 form in effect a series RL circuit, and increasing resistance decreases the angle by which the alternating current flowing through the circuit lags the alternating voltage applied across the circuit. The three rheostats 38 connected in the three rectangular-wave alternate bias current control circuits are simultaneously adjustable by the common operating means 38a, and thus pre-excitation of all commutating reactors R1–R6 can be advanced or retarded in unison.

Tapped resistor 39 in parallel with rectifier 40 provides means for varying the pre-excitation moment of one commutating reactor in relation to the pre-excitation moment of the interconnected commutating reactor. It is possible that the average voltage supplied to the load circuit by one of the two sets of Y-connected transformer secondary windings, S1, S3 and S5 or S2, S4 and S6, may tend to be higher than the average voltage supplied by the other set. This condition may be caused, for example, by unequal reactances in the phase circuits which connect the two sets of windings to the load. The resistors 39 and rectifiers 40 permit relative control of the average voltage supplied by one set of windings with respect to the average voltage supplied by the other set of windings, whereby the voltage contribution to the load circuit by both sets of Y-connected transformer secondary windings can be equalized. Tapped resistor 39 and rectifier 40 are connected in the alternating bias current control circuit and unbalance this circuit by introducing a definite resistance to bias current flowing in one direction while presenting negligible resistance to bias current of the opposite direction. With rectifier 40 connected as shown in Fig. 5, only negative bias current $I_a$ passes through resistance 39, and as a result, the period of each negative half cycle of $I_a$ becomes shorter than the period of each positive half cycle. Thus the pre-excitation moment for commutating reactor R1 is retarded with respect to the pre-excitation moment for commutating reactor R4. By reversing the direction of rectifier 40, the pre-excitation moment for reactor R1 will be advanced with respect to the pre-excitation moment for reactor R4. The operation of this circuit can best be explained graphically by reference to Fig. 6.

In Fig. 6 it is assumed that a sinusoidal voltage V is applied to current limiting reactor combination 31 in series with rheostat 38 and the parallel circuit of tapped resistor 39 and rectifier 40. In fact, of course, the voltage is not sinusoidal due to the contribution from control windings A1 and A4, but the operating principles involved are not changed by this simplifying assumption. The voltage applied to reactor combination 31 during a positive half cycle of bias current $I_a$ comprises the constant voltage drop across rheostat 38 subtracted from voltage V, as shown between moments $e'$ and $g'$ in Fig. 6. Rectifier 40 provides a shunt path of negligible resistance for positive bias current $I_a$ during this period. Negative bias current $I_a$ flows from moment $g'$ to $e'$, and this negative current is blocked by rectifier 40 and must flow through tapped resistor 39. Therefore, the voltage applied to combination 31 during a negative half cycle of bias current $I_a$ comprises the voltage across rheostat 38 plus the voltage across resistor 39 added to voltage V. In accordance with the previously described operation of reactor combination 31, the shaded area under the negative half cycle of $V_{31}$ must be equal to the shaded area under the positive half cycle of $V_{31}$, as is shown in Fig. 6. The unshaded areas under the two half cycles must also be equal to each other. But now the period of positive bias current is greater than 180 electrical degrees, and the angle $\alpha'$ of bias current change from negative to positive direction is less than the angle $\alpha''$ of bias current change from positive to negative. As a result, the pre-excitation moment $g'$ for commutating reactor R1 is retarded with respect to the pre-excitation moment $e'$ for commutating reactor R4. By setting the tap of resistor 39 for substantially zero resistance, the unbalancing effect of this circuit can be removed.

Brief consideration will now be given to mechanical rectifier starting. No load is connected to the positive and negative D. C. leads while the mechanical rectifier is started. The contact actuating mechanism is adjusted so that all of the switch contacts C1–C6 are open when synchronous motor 11 is first connected to the supply power by closing disconnect switch 12. The contact closed periods are then gradually increased from zero to their normal operating relationships. This gradual adjustment during starting may be made, for example, by any suitable mechanism for simultaneously and gradually changing the lengths of the push rods which are operated by cams 14, 15, and 16 illustrated schematically in Fig. 1. The two pole circuit breaker 18 must be open during the starting operation thereby to isolate electrically the common load circuit side of contacts C1, C3 and C5 from the common load circuit side of contacts C2, C4 and C6. If circuit breaker 18 were closed, a circuit including interphase transformer IT would be made when the contacts associated with one set of Y-connected transformer secondary windings first overlap the contacts associated with the other set of windings, and magnetizing current for transformer IT would flow. But at this stage in the starting operation the contacts could not interrupt magnetizing current without sparking. The disconnect switch 25 associated with the contact shunting circuits B1–B6 should also be open during the starting operation. This open circuit blocks current which otherwise would flow from one phase, through a closed switch contact, through the shunting circuits which bypass the two associated open contacts, to the other two phases of one set of Y-connected transformer secondary windings. Such current would have twice the magnitude of $I_b$ and could not be successfully broken by a contact without sparking, since the shunting circuit bypassing the opening contact would only divert one half of this current.

After the contact closed periods of both groups of contacts have been increased to greater than 120 degrees, the contacts in each group begin to overlap, and now voltage and phasing conditions in the main and control circuits associated with each commutating reactor have their proper operating relationships for sparkless contact opening and closing. Current is bypassed around an open contact through two shunting circuits in series. After the contact actuating mechanism is fixed in its normal operating cycle, disconnect switch 25 and circuit breaker 18 can be closed, and the mechanical rectifier is ready for operation under load.

While I have shown and described a preferred form of my invention by way of illustration, many modifications will occur to those skilled in the art. For example, although I have illustrated a single-way mechanical rectifier supplied by six-phase alternating voltage, my invention is equally adaptable and may be employed for pre-exciting six commutating reactors associated with a double-way mechanical rectifier supplied by three-phase alternating voltage. I, therefore, contemplate by the appended claims to cover all such modifications as fall within the true spirit and scope of my invention.

What I claim as new and desire to secure by Letters Patents of the United States is:

1. In an apparatus for rectifying alternating current, a current conducting phase circuit adapted to be connected to a source of alternating voltage and including a movable contact operable to open and close the circuit, actuating means for cyclically operating said contact in synchronism with the alternating voltage thereby to rectify the alternating current, said actuating means periodically closing said contact in advance of zero voltage in said phase circuit, a current limiting shunting circuit connected to bypass said contact, said shunting circuit limiting the current in said phase circuit to a predetermined maximum magnitude whenever said contact is open, a saturable reactor having a main winding connected in series in said phase circuit, a control winding for said reactor, and a source of bias current of substantially rectangular waveform connected to supply to said control winding alternating forward and reverse bias current, said forward bias current saturating said reactor in opposition to the magnetization produced by current of said predetermined maximum magnitude flowing in said main winding and said reverse bias current unsaturating said reactor, said bias current source being arranged to change the bias current from its forward to its reverse direction at a predetermined instant of time before said contact is closed, whereby said reactor is unsaturated and the voltage in said phase circuit is applied across said main winding thereby to control the rate of change of flux in said reactor during contact closure.

2. In an apparatus for rectifying alternating current, a current conducting phase circuit coupled to an alternating voltage supply circuit and including a movable contact operable to open and close the circuit, actuating means for cyclically operating said contact in synchronism with the alternating voltage thereby to rectify the alternating current, a current limiting shunting circuit connected to bypass said contact, said shunting circuit limiting the current in said phase circuit to a predetermined maximum magnitude whenever said contact is open, a saturable reactor having a main winding connected in series in said phase circuit, whereby rectified current flowing in said phase circuit magnetizes said reactor in a forward direction, a control winding for said reactor, and a source of bias current of substantially rectangular waveform connected to supply said control winding with alternating forward and reverse bias current, said forward bias current saturating said reactor in its forward direction even though current of said predetermined maximum magnitude is flowing in the reverse direction through said main winding and said reverse bias current unsaturating said reactor, said bias current source being arranged to change said bias current from its forward to its reverse direction in advance of zero voltage in said phase circuit and at a predetermined instant of time before said contact is closed, whereby said contact is closed while the magnetization of said reactor is undergoing changes corresponding to a minor hysteresis loop.

3. In an apparatus for rectifying alternating current, a polyphase alternating voltage supply circuit, a pair of current conducting phase circuits coupled to said supply circuit, each of said phase circuits including a movable contact operable to open and close circuit, synchronous actuating means for cyclically operating each said contact in inverse non-overlapping relationship with respect to the other said contact thereby to rectify the alternating current, said actuating means periodically closing each said contact in advance of zero voltage in the associated phase circuit, a pair of current limiting shunting circuits each connected to bypass one of said contacts for conducting not more than a predetermined limited magnitude of current whenever the associated contact is open, a pair of saturable reactors each having a first winding connected in series in one of said phase circuits, a second winding for each of said reactors, a source of direct current of predetermined magnitude connected to each said second winding, a third winding for each of said reactors, a unilateral resistive circuit connected across each said third winding to conduct current in only one direction, means interconnecting in opposing series circuit relationship the third windings of said reactors, and a source of bias current of substantially rectangular waveform connected to supply said interconnected third windings with alternating bias current to unsaturate one of said reactors while saturating the other reactor in opposition to the magnetization produced by the flow of current of said predetermined limited magnitude in the first winding of said other reactor, said bias current source being arranged to change the direction of said bias current at a predetermined instant of time during the period that both contacts are open to unsaturate the reactor associated with the contact next to be closed, whereby the voltage in the phase circuit being closed is applied across the first winding of the associated reactor to control the rate of change of flux in that reactor while the contact is closing.

4. In an apparatus for rectifying alternating current, a plurality of current conducting phase circuits adapted to be connected to a source of polyphase alternating voltage, a plurality of movable contacts each connected to open and close one of said phase circuits, synchronous actuating means for cyclically opening and closing said contacts in overlapping sequence whereby rectified current is conducted between the source and a load, a plurality of current limiting contact shunting circuits each connected to bypass one of said contacts, each of said shunting circuits effective whenever the associated contact is open to limit to a predetermined maximum magnitude the current flowing through the associated phase circuit in either a forward or a reverse direction with respect to the direction of rectified current, a plurality of saturable reactors each having a main winding connected in series in one of said phase circuits, each of said reactors being saturated in a forward direction by rectified current, a plurality of control windings each provided for one of said reactors, and a plurality of sources of bias current connected to supply to said control windings alternating forward and reverse bias current of substantially rectangular waveform, said forward bias current saturating the associated reactor in its forward direction in opposition to the magnetization produced when said maximum current flows in the reverse direction through the main winding and said reverse bias current unsaturating the associated reactor with less than said maximum current flowing in the main winding, each of said sources of bias current being phased with respect to the polyphase alternating voltage to change the direction of bias current in a control winding from forward to reverse before the associated contact is closed and in advance of zero voltage in the associated phase circuit, whereby the associated reactor is unsaturated and the voltage formerly across the open contact is applied across the reactor main winding to control the change of flux in the associated reactor as the flux deviates from its saturation value, said synchronous actuating means being arranged to close the associated contact during this unsaturated period while there is negligible voltage across the contact and less than said maximum current flowing through the shunting circuit.

5. In an apparatus for rectifying alternating current, a plurality of current conducting phase circuits coupled to successive phases of a source of polyphase alternating voltage, a plurality of circuit opening and closing contacts each connected in one of said phase circuits, synchronous actuating means for cyclically operating said contacts in overlapping sequence thereby to rectify the alternating current, a plurality of current limiting bidirectional shunting circuits each connected to bypass one of said contacts for conducting not more than a limited magnitude of current whenever the associated contact is open, a plurality of saturable reactors each having a first winding connected in series in one of said phase circuits, each of said reactors being magnetized in a forward direction by rectified current, a second winding for each of said reactors, means supplying said second winding with substantially constant magnitude direct current for magnetizing the associated reactor in its forward direction, a third winding for each of said reactors, means interconnecting in opposing series circuit relationship the third windings for each pair of reactors associated with a pair of contacts which are cyclically operated in inverse relationship with respect to each other, a unilateral resistive circuit connected across each of said third windings to conduct current in one direction only, and means coupled to the source of alternating voltage for supplying each pair of interconnected third windings with alternating bias current having substantially rectangular waveform, the magnitude of said direct current and the amplitude of said alternating bias current being selected to saturate one of the paired reactors in its forward direction in opposition to magnetization produced by said limited magnitude of current flowing in the reverse direction through the associated first winding and to unsaturate the other reactor with less than said limited magnitude of current flowing in the forward direction through its first winding, said alternating bias current being phased with respect to the alternating voltage to change directions during the period when both inversely operated contacts are open and in advance of zero voltage in the phase circuit next to be closed to unsaturate the reactor associated with the phase circuit next to be closed, whereby the flux in the associated reactor changes through a minor hysteresis loop under control of the circuit voltage which is now applied across the first winding of that reactor and which changes polarity immediately following its zero value, said actuating means being arranged to close the contact connected in the next to be closed phase circuit during this unsaturated period of the associated reactor, whereby the contact voltage and current are limited to negligible values by the resulting highly inductive state of the associated reactor.

6. In an apparatus for rectifying alternating current, a plurality of current conducting phase circuits coupled to successive phases of a source of polyphase alternating voltage, a plurality of movable contacts each connected for opening and closing one of said phase circuits, synchronous actuating means for cyclically operating said contacts in overlapping sequence thereby to rectify the alternating current, said actuating means being arranged periodically to close each of said contacts in advance of zero voltage in the phase circuit being closed, a capacitor series connected in each of said phase circuits to supply voltage proportional to the magnitude of current being rectified for commutating the rectified current between successive phase circuits, a plurality of bi-directional shunting circuits each connected to bypass one of said contacts for conducting not more than a maximum magnitude of current whenever the associated contact is open and for limiting the voltage across the open contact to a negligible magnitude whenever less than said maximum magnitude of current is flowing through the shunting circuit, a plurality of saturable reactors each having a first winding connected in series in one of said phase circuits, each of said reactors being magnetized in a forward direction by rectified current, a second winding for each of said reactors, means supplying the second windings with substantially constant magnitude direct current for magnetizing each of said reactors in its forward direction, a third winding for each of said reactors, and a plurality of means for supplying each of the third windings with alternating bias current of substantially rectangular waveform, the magnitude of said direct current and the amplitude of said alternating bias current being selected alternately to saturate the associated reactor in its forward direction in opposition to magnetization produced by said maximum magnitude of current flowing in the reverse direction through its first winding and to unsaturate the associated reactor with current of less than said maximum magnitude flowing through its first winding, each of said alternating bias current supply means being arranged periodically to unsaturate the associated reactor at a predetermined instant of time before the associated contact is closed.

7. In an apparatus for rectifying alternating current, a plurality of current conducting phase circuits coupled to a source of polyphase alternating voltage, a plurality of circuit opening and closing contacts each connected in one of said phase circuits, synchronous actuating means for cyclically operating said contacts in overlapping sequence whereby rectified current is conducted between the source and a load, said actuating means being arranged periodically to close each of said contacts in advance of zero voltage in the phase circuit being closed, a capacitor series connected in each of said phase circuits to supply voltage proportional to the magnitude of rectified current for commutating the rectified current between successive phase circuits, a plurality of current and voltage limiting bi-directional shunting circuits each connected to bypass one of said contacts, each of said shunting circuits limiting to a predetermined maximum magnitude the current in the associated phase circuit when the associated contact is open and limiting the voltage across the open contact to a negligible magnitude whenever less than the predetermined maximum magnitude of current is flowing in the phase circuit, a plurality of saturable reactors each having a first winding connected in series in one of said phase circuits, each of said reactors being saturated in a forward direction by rectified current, a plurality of second windings each provided for one of said reactors, a source of direct current connected to supply said second windings with direct current of substantially constant magnitude for magnetizing each of said reactors in its forward direction, a plurality of third windings each provided for one of said reactors, means interconnecting in opposing series circuit relationship the third windings for each pair of reactors associated with each pair of contacts having inverse operating cycles, a plurality of sources of alternating current each connected to supply one pair of interconnected third windings with alternating bias current of substantially rectangular waveform, the magnitude of said direct current and the amplitude of said alternating bias current being selected to saturate one of the paired reactors in its forward direction in opposition to magnetization produced by said maximum magnitude of current flowing in the reverse direction through the associated first winding and to unsaturate the other paired reactor with current of less than said maximum magnitude flowing through its first winding, the alternating bias current supplied by each of said bias current sources being phased with respect to the polyphase alternating voltage to change directions during the period when both of the associated inversely operated pair of contacts are open to unsaturate the reactor associated with the phase circuit next to be closed thereby to limit the current in the first winding of said associated reactor to less than said maximum magnitude, and a unilateral resistive circuit connected across each of said third windings to conduct current in parallel with the third winding whenever bias current is saturating the associated reactor in its forward direction.

8. In an apparatus for rectifying alternating current, a pair of current conducting phase circuits coupled to a source of polyphase alternating voltage, a pair of movable contacts connected to open and close said phase circuits, synchronous actuating means for cyclically operating said contacts in inverse non-overlapping relationship with respect to each other thereby to rectify the alternating current, a pair of current limiting shunting circuits each connected to bypass one of said contacts for conducting not more than a predetermined limited magnitude of current whenever the associated contact is open, two saturable reactors each having a first winding connected in series in one of said phase circuits, a pair of second windings for said reactors, a source of direct current of predetermined magnitude connected to said second windings, a pair of third windings for said reactors, a pair of unilateral resistive circuits each connected across one of said third windings to conduct current in only one direction, means interconnecting said third windings in opposing series circuit relationship, and a source of bias current connected to supply said interconnected third windings with alternating positive and negative bias current of substantially rectangular waveform, said bias current source including means to vary the period of each half cycle of positive bias current with respect to the period of each half cycle of negative bias current, said positive bias current unsaturating a first one of said reactors while saturating the second one of said reactors in opposition to the magnetization produced by the flow of current of said predetermined limited magnitude in the first winding of said second reactor, said negative bias current unsaturating said second reactor while saturating said first reactor in opposition to the magnetization produced by the flow of current of said predetermined limited magnitude in the first winding of said first reactor, said bias current source being arranged to change bias current direction during the period that both contacts are open and in advance of zero voltage in the phase circuit next to be closed to unsaturate the reactor associated with the phase circuit next to be closed while saturating the reactor associated with the phase circuit last opened, whereby voltage in the phase circuit being closed is applied across the first winding of the associated reactor to control the change of flux in that reactor while the contact is closing.

9. In a circuit controlling apparatus having a pair of cyclically actuated circuit opening and closing contacts arranged to conduct direct current in alternating relationship with respect to each other, two rectifier bridge networks each having a pair of alternating current and a pair of direct current terminals, means connecting each pair of alternating current terminals across one of said contacts, two inductive circuits each connected across one pair of direct current terminals for limiting change of current flowing therein, and transformer coupling means interconnecting said inductive circuits.

10. In a circuit controlling apparatus having a pair of cyclically actuated circuit opening and closing contacts arranged to conduct direct current in alternating relationship with respect to each other; a pair of current limiting shunting circuits each connected to bypass one of said contacts, each of said shunting circuits comprising a rectifier bridge network having a pair of alternating current and a pair of direct current terminals, means connecting said alternating current terminals across the associated contact, and an inductive circuit connected across said direct current terminals and including an inductance element for limiting current flow to a predetermined maximum magnitude when a predetermined voltage is applied to said alternating current terminals while the associated contact is open; and transformer coupling means interconnecting the inductive circuits of both shunting circuits for supplying voltage to one shunting circuit when there is voltage across the alternating current terminals of the other shunting circuit thereby to aid in maintaining said predetermined magnitude of current flow through the inductive circuit of said one shunting circuit while its associated contact is closed.

11. In an apparatus for rectifying alternating current, a pair of current conducting phase circuits adapted to be connected to a source of polyphase alternating voltage, each of said phase circuits including a movable contact operable to open and close the circuit, synchronous actuating means for cyclically operating the movable contacts in inverse non-overlapping relationship with respect to each other, a pair of current limiting bypass circuits each comprising a rectifier bridge network having alternating current and direct current terminals and an inductive circuit connected across the direct current terminals, said bypass circuits including transformer coupling means inductively interconnecting the inductive circuits, means connecting the alternating current terminals of each of said bypass circuits in shunting relationship to one of said contacts, whereby each of said bypass circuits will conduct not more than a predetermined limited magnitude of current whenever the associated contact is open, a pair of saturable reactors each having a first winding connected in series in one of said phase circuits, a second winding for each of said reactors, a source of direct current of predetermined magnitude connected to each said second winding, a third winding for each of said reactors, a unilateral resistive circuit connected across each said third winding to conduct current in only one direction, means interconnecting in opposing series circuit relationship the third windings of said reactors, and a source of bias current of substantially rectangular waveform connected to supply said interconnected third windings with alternating bias current to unsaturate one of said reactors while saturating the other reactor in opposition to the magnetization produced by the flow of current of said predetermined limited magnitude in the first winding of said other reactor, said bias current source being arranged to change the direction of said bias current at a predetermined instant of time during the period that both contacts are open to unsaturate the reactor associated with the contact next to be closed, whereby the voltage in the phase circuit being closed is applied across the first winding of the associated reactor to control the rate of change of flux in that reactor while the contact is closing.

References Cited in the file of this patent
UNITED STATES PATENTS

| | | |
|---|---|---|
| 2,637,769 | Walker | May 5, 1953 |
| 2,691,128 | Wegener | Oct. 5, 1954 |
| 2,697,198 | Schmidt | Dec. 14, 1954 |
| 2,705,766 | Chen | Apr. 5, 1955 |
| 2,738,456 | Kleinvogel et al. | Mar. 13, 1956 |